(12) United States Patent
Sato

(10) Patent No.: US 12,654,703 B2
(45) Date of Patent: Jun. 16, 2026

(54) TRAVELING ASSISTANCE APPARATUS FOR VEHICLE

(71) Applicant: SUBARU CORPORATION, Tokyo (JP)

(72) Inventor: Junichi Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 30 days.

(21) Appl. No.: 18/945,700

(22) Filed: Nov. 13, 2024

(65) Prior Publication Data

US 2025/0162586 A1 May 22, 2025

(30) Foreign Application Priority Data

Nov. 22, 2023 (JP) ................................. 2023-198453

(51) Int. Cl.
  *B60W 30/18* (2012.01)
  *B60W 50/14* (2020.01)
(52) U.S. Cl.
  CPC ...... *B60W 30/18009* (2013.01); *B60W 50/14* (2013.01); *B60W 2756/10* (2020.02)
(58) Field of Classification Search
  CPC ...... B60W 40/10; B60W 30/00; B60W 10/04; B60W 50/14; B60K 28/165; G05D 1/0088; F16D 48/06; G06F 7/00; G06Q 10/40; B62D 15/0285
  See application file for complete search history.

(56) References Cited

U.S. PATENT DOCUMENTS

| | | | | |
|---|---|---|---|---|
| 5,732,380 A * | 3/1998 | Iwata | ................... | B60K 28/165 |
| | | | | 701/84 |
| 9,008,890 B1 * | 4/2015 | Herbach | ............... | B60W 30/00 |
| | | | | 340/436 |
| 10,363,959 B2 * | 7/2019 | Stefan | ................ | B62D 15/0285 |
| 10,553,119 B1 * | 2/2020 | Shah | ...................... | G06Q 10/40 |

(Continued)

FOREIGN PATENT DOCUMENTS

| | | |
|---|---|---|
| JP | 2007-38918 A | 2/2007 |
| JP | 2019-202645 A | 11/2019 |

*Primary Examiner* — Yuri Kan
(74) *Attorney, Agent, or Firm* — TROUTMAN PEPPER LOCKE LLP

(57) ABSTRACT

A traveling assistance apparatus for a vehicle includes a first recognizer acquiring surrounding environment information, a second recognizer acquiring vehicle condition information, a notifier notifying a driver of predetermined information, and a control processing unit performing vehicle traveling control and including a determiner and first and second processors. The determiner determines whether the vehicle is in a stuck state, based on the vehicle condition information, and evaluates a stuck level when the vehicle is in the stuck state. The first processor executes first recovery assistance control that automatically assists the vehicle in recovering from the stuck state. The second processor executes second recovery assistance control that outputs, to the notifier, first recovery operation instruction information based on which the vehicle is to recover from the stuck state. The control processing unit executes either of the first recovery assistance control or the second recovery assistance control, depending on the stuck level.

12 Claims, 3 Drawing Sheets

(56)         References Cited

U.S. PATENT DOCUMENTS

| | | | |
|---|---|---|---|
| 2014/0121929 A1* | 5/2014 | Murofushi | G06F 7/00 |
| | | | 701/70 |
| 2016/0010707 A1* | 1/2016 | Milehins | F16D 48/06 |
| | | | 701/68 |
| 2021/0055728 A1* | 2/2021 | Pomish | G05D 1/0088 |
| 2025/0033645 A1* | 1/2025 | Kang | B60W 50/14 |
| 2025/0196838 A1* | 6/2025 | Kang | B60W 10/04 |

* cited by examiner

[ RECOVERY OPERATION INSTRUCTIONS CORRESPONDING TO STUCK PATTERNS ]

| No. | STUCK PATTERN ROAD SURFACE CONDITION | RECOVERY OPERATION INSTRUCTION | | | | REFERENCE MOVIE |
|---|---|---|---|---|---|---|
| | | TRAVELING MODE | SHIFT POSITION | ACCELERATOR OPERATION | STEERING ANGLE | |
| 1 | WHEEL SKID ON FLAT ROAD | BAD-ROAD TRAVELING MODE : FIRST BAD-ROAD MODE | D | MAINTAIN ACCELERATOR AT LOW POSITION | STRAIGHT AHEAD | YES |
| 2 | WHEEL SKID UPON CLIMBING | BAD-ROAD TRAVELING MODE : FIRST BAD-ROAD MODE | D | GRADUALLY STEP ON ACCELERATOR | STRAIGHT AHEAD | YES |
| 3 | IRREGULARITIES OR ROCKY AREAS | BAD-ROAD TRAVELING MODE : SECOND BAD-ROAD MODE | D | GRADUALLY STEP ON ACCELERATOR | TURN | YES |
| 4 | WHEEL FALLEN INTO HOLES OR CAVE-INS | BAD-ROAD TRAVELING MODE : SECOND BAD-ROAD MODE | D | GRADUALLY STEP ON ACCELERATOR | TURN | YES |
| 5 | SANDY OR MUDDY AREAS | BAD-ROAD TRAVELING MODE : SECOND BAD-ROAD MODE | D | GRADUALLY STEP ON ACCELERATOR | STRAIGHT AHEAD | YES |

FIG. 2

TRAVELING ASSISTANCE APPARATUS FOR VEHICLE

CROSS-REFERENCE TO RELATED APPLICATIONS

The present application claims priority from Japanese Patent Application No. 2023-198453 filed on Nov. 22, 2023, the entire contents of which are hereby incorporated by reference.

BACKGROUND

The disclosure relates to a traveling assistance apparatus for a vehicle.

All-wheel drive vehicles with a structure that drives all front and rear wheels (usually four wheels) have been put into practical use and are in general use as typical exemplary four-wheel automobiles in the field of vehicles such as automobiles.

The all-wheel drive vehicles are expected to be widely used in various traveling environments because of its high performance on bad roads. For example, when traveling on bad roads such as unpaved roads or rough terrain regions, the vehicle enters a slush region, a snow region, for other bad-condition regions, in some cases. In these cases, the vehicle can come into a stuck state where the vehicle has a difficulty in driving due to idling of the drive wheels or other inconveniences.

Even in such a stuck state, an all-wheel drive vehicle makes it possible to recover from the stuck state by devising driving operations. However, if an excess driving force is applied to the drive wheels or other unreasonable operations are performed when the vehicle is in the stuck state, for example, wheel spin or other phenomena can occur, worsening the stuck state.

To address this issue, various traveling assistance apparatuses have been proposed that assist recovery of vehicles such as all-wheel drive vehicles from the stuck state. Reference are made to Japanese Unexamined Patent Application Publication (JP-A) Nos. 2007-38918 and 2019-202645, for example.

The traveling assistance apparatus disclosed in JP-A No. 2007-38918, for example, is configured to provide traveling assistance that assists a vehicle stuck on a sandy road in recovering from the stuck state by raising or lowering the vehicle height using an absorber and thereby changing the state of contact between the wheels and the sandy road and the grip of the wheels on the sandy road.

The traveling assistance apparatus for vehicles disclosed in JP-A No. 2019-202645, for example, is configured to provide traveling assistance that assists a vehicle in the stuck state in recovering from the stuck state by automatically switching the direction of driving force and repeatedly moving the vehicle forward and backward.

SUMMARY

An aspect of the disclosure provides a traveling assistance apparatus for a vehicle. The traveling assistance apparatus includes a first recognizer, a second recognizer, a notifier, and a control processing unit. The first recognizer is configured to acquire surrounding environment information on the vehicle. The second recognizer is configured to acquire vehicle condition information on the vehicle. The notifier is configured to notify a driver who drives the vehicle of predetermined information. The control processing unit is configured to perform traveling control for the vehicle, and includes a determiner, a first processor, and a second processor. The determiner is configured to determine whether the vehicle is in a stuck state, based on the vehicle condition information, and make an evaluation of a stuck level when the vehicle is determined to be in the stuck state. The first processor is configured to execute first recovery assistance control that automatically assists the vehicle in recovering from the stuck state. The second processor is configured to execute second recovery assistance control that outputs, to the notifier, first recovery operation instruction information based on which the vehicle is to recover from the stuck state. The control processing unit is configured to execute any one of the first recovery assistance control with the first processor or the second recovery assistance control with the second processor, depending on the stuck level.

An aspect of the disclosure provides a traveling assistance apparatus for a vehicle. The traveling assistance apparatus includes circuitry. The circuitry configured to acquire surrounding environment information on the vehicle, acquire vehicle condition information on the vehicle, cause a notifier to notify a driver who drives the vehicle of predetermined information, and perform traveling control for the vehicle. The circuitry is configured to determine whether the vehicle is in a stuck state, based on the vehicle condition information, and evaluate a stuck level when the vehicle is determined to be in the stuck state, execute first recovery assistance control that automatically assists the vehicle in recovering from the stuck state, execute second recovery assistance control that outputs, to the notifier, first recovery operation instruction information based on which the vehicle is to recover from the stuck state, and execute any one of the first recovery assistance control or the second recovery assistance control, depending on the stuck level.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 is a table illustrating examples of recovery operation instructions given by a second recovery assistance processor of the traveling assistance apparatus illustrated in FIG. 1.

DETAILED DESCRIPTION

Figure 1:
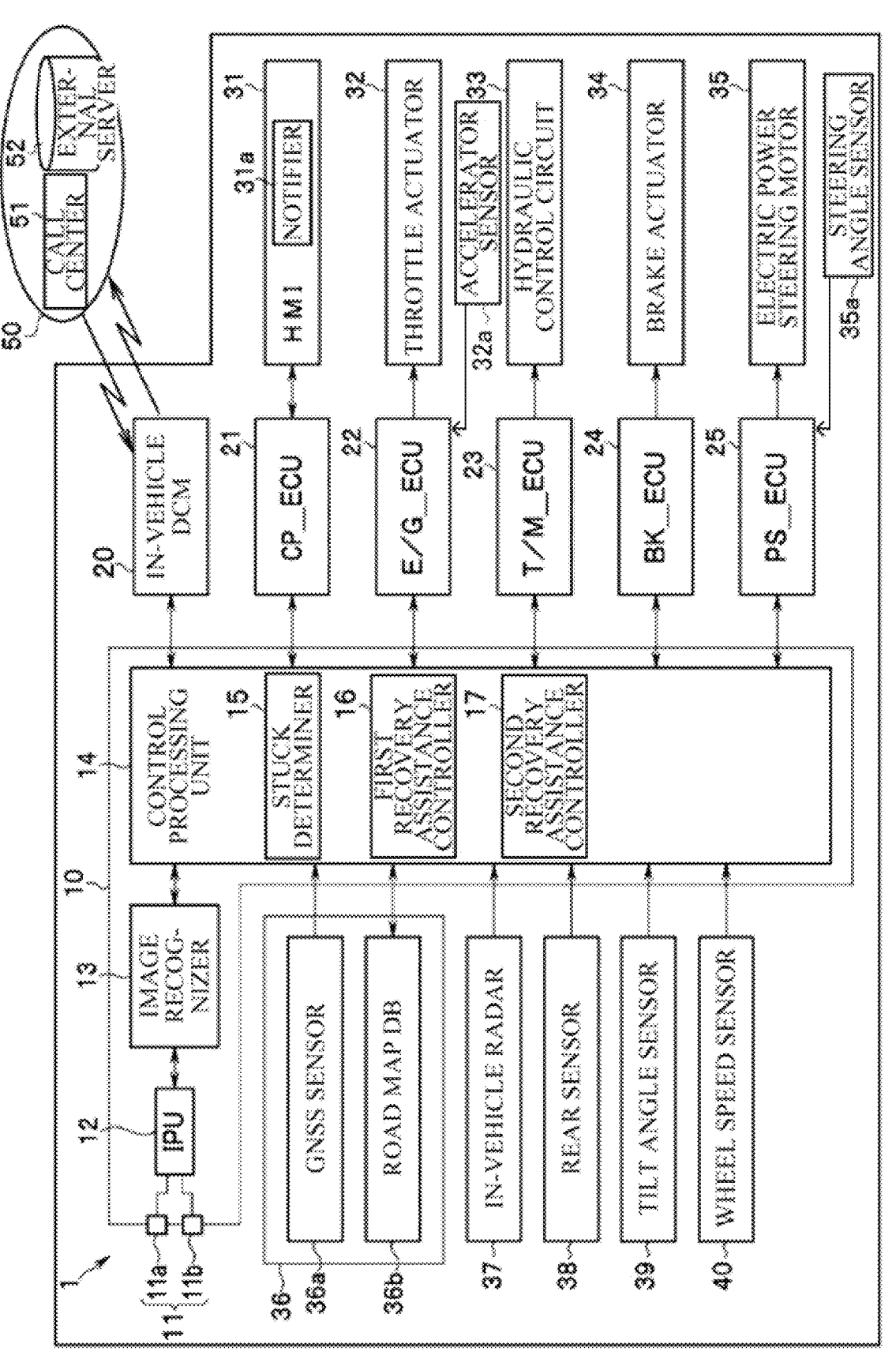
FIG. 1 is a block diagram illustrating a schematic configuration of a traveling assistance apparatus for a vehicle according to one example embodiment of the disclosure.

A traveling assistance apparatus described in JP-A No. 2007-38918, for example, involves use of a dedicated device to raise or lower the vehicle height. This can complicate the vehicle configuration and increase the product cost.

A traveling assistance apparatus described in JP-A No. 2019-202645, for example, is operated on the assumption that the driving force of drive wheels is reliably transmitted to a road surface to move a vehicle in a stuck state in a front-rear direction. The traveling assistance apparatus, however, can have a difficulty in assisting the recovery of the vehicle from the stuck state, depending on the stuck state of the vehicle.

In general, a driver or a user who drives a vehicle is not necessarily well acquainted with appropriate operations for the recovery of the vehicle from the stuck state. When the vehicle is actually stuck, the driver or user, even if having knowledge about the appropriate operations for the recovery of the vehicle from the stuck state, can be put into a panic or a confusion and fail to calmly deal with the situation.

It is desirable to provide a traveling assistance apparatus for a vehicle that makes it possible to automatically execute, when the vehicle has come into a stuck state during the travel in a bad-road region, traveling assistance control for the vehicle, including control for recovery of the vehicle from the stuck state, by recognizing a surrounding environment and a vehicle condition.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First, a schematic configuration of a traveling assistance apparatus 1 for a vehicle according to an example embodiment of the disclosure will be described below with reference to FIG. 1. FIG. 1 is a block diagram illustrating a schematic configuration of the traveling assistance apparatus 1 according to the example embodiment of the disclosure.

The traveling assistance apparatus 1 illustrated in FIG. 1 may have a configuration generally similar to that of an existing traveling assistance apparatus for the same type of vehicle. Therefore, illustration and a detailed description of typical components included in the existing traveling assistance apparatus are omitted in FIG. 1 and the following description, whereas components directly related to the example embodiment of the disclosure are illustrated in FIG. 1 and the following description.

The traveling assistance apparatus 1 according to the example embodiment may include a camera unit 10. The camera unit 10 may be an in-vehicle camera including a stereo camera 11. The stereo camera may be fixed in a front upper central portion of the interior of a non-illustrated vehicle mounted with the traveling assistance apparatus 1.

As illustrated in FIG. 1, the camera unit 10 may include the stereo camera 11, an image processing unit (IPU) 12, an image recognizer 13, and a control processing unit 14.

The stereo camera 11 may include two cameras: a main camera 11a and a subsidiary camera 11b. In some embodiment, the main camera 11a and the subsidiary camera 11b may be disposed symmetrically about a vehicle-width center in the interior of the vehicle, facing toward the front of the vehicle. The main camera 11a and the subsidiary camera 11b may each include an imaging optical system, an imaging device such as a CMOS image sensor, a processing circuit that processes imaging signals or other signals, and other elements. Note that illustration of a detailed configuration of the stereo camera 11 is omitted in FIG. 1.

With this configuration, the stereo camera 11 may acquire, with the main camera 11a and the subsidiary camera 11b having respective lines of sight different from each other, two pieces of image data on a predetermined range of a surrounding environment outside and in front of the vehicle at predetermined imaging cycles synchronized with each other. Based on these pieces of image data thus acquired, stereo image data may be generated. The stereo image data may represent the surrounding environment in which the vehicle is traveling. In one embodiment, the stereo image data may serve as "surrounding environment information". The stereo image data or the surrounding environment information generated by the stereo camera 11 may be output to the IPU 12.

The IPU 12 may be a configuration unit or a circuit unit that performs predetermined image processing on the surrounding environment information, which is the image data representing the surrounding environment in which the vehicle is traveling, acquired by the stereo camera 11. In some embodiments, the IPU 12 may perform processing to detect edges of various objects, such as physical objects or lane lines, included in the image data.

The IPU 12 may acquire distance information, based on the amount of displacement between corresponding edges in the left and right images of the stereo image data, and generate image information including that distance information (distance image information). The distance image information or other information generated by the IPU 12 may be output to the image recognizer 13.

Based on the distance image information or other information received from the IPU 12, the image recognizer 13 may calculate road curvatures [1/m] of, for example, left and right lane lines of a travel lane (vehicle travel path) on which the vehicle is traveling, and the width between the left and right lane lines (lane width). Various known methods may be used to calculate the road curvatures and the lane width.

Further, based on the distance image information acquired by the stereo camera 11, the image recognizer 13 may perform predetermined processing such as pattern matching to recognize the following objects: three-dimensional objects extending along the road such as guardrails, curbs, and other vehicles in the vicinity; parking frame lines marked on the road surface of a parking lot or other premises; three-dimensional structures such as vehicle stoppers that define parking areas; and the distances to adjacent vehicles. The image recognizer 13 may also recognize, for example, the condition of the road surface or a ground surface (hereinafter referred to as "wheel contact surface") around the vehicle (hereinafter referred to as "road surface condition").

The recognition of an object such as a three-dimensional object by the image recognizer 13 may include recognition of the type of the three-dimensional object, the height of the three-dimensional object, the width of the three-dimensional object, the distance from the vehicle to the three-dimensional object, a relative velocity between the three-dimensional object and the vehicle, and the relative distance between two three-dimensional objects (e.g., the lateral distance between a curb at an edge of the road and a nearby lane line).

The recognition of the road surface condition by the image recognizer 13 may include, but not limited thereto, the following identification:

(1) Schematic identification of paved roads, unpaved roads, rough terrains, or similar regions;

(2) Identification of more detailed (e.g., muddy, sandy, or snow) conditions of unpaved roads, rough terrains or similar regions having been identified;

(3) Identification of flooded roads such as underpasses; and (4) Identification of puddles, slush regions, snow regions or similar regions.

In some embodiments, these road surface conditions may be estimated based on differences in image brightness.

Various kinds of information recognized by the image recognizer 13 may be output to the control processing unit 14 as the surrounding environment information. In one embodiment, the camera unit 10 including the image recognizer 13 may serve as a "first recognizer" that recognizes the surrounding environment of the vehicle.

The control processing unit 14 included in the camera unit 10 may be a configuration unit or circuit unit that controls traveling of the vehicle mounted with the traveling assistance apparatus 1 by controlling the camera unit 10 and an overall operation of the traveling assistance apparatus 1 of the example embodiment.

The control processing unit 14 may be coupled to various control units, such as an in-vehicle data communication module (DCM) 20, a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25, through in-vehicle communication lines such as a controller area network (CAN).

The in-vehicle DCM 20 may be a communicator that establishes interactive communication through constant connection between the control processing unit 14, which is included in the camera unit 10, and an information center 50, which is a predetermined external facility or external system.

The information center 50 may be an external facility that includes, for example, a call center 51 and an external server 52, and conducts management of information on vehicles. The call center 51, the external server 52, and other related components in the information center 50 may be coupled, for example, to a communication network, such as the Internet.

In some embodiments, the in-vehicle DCM 20 may perform voice communication as well as data communication. This configuration allows the traveling assistance apparatus 1 of the example embodiment to perform voice communication with an operator stationed at the call center 51 through the in-vehicle DCM 20, and to also perform data communication with the external server 52 to transmit various kinds of data acquired at the vehicle. Non-limiting examples of the various kinds of data acquired at the vehicle may include the surrounding environment information, and vehicle condition information acquired by a second recognizer which will be described below. In some embodiments, the surrounding environment information may include vehicle position data on the latitude, longitude, and altitude of the position of the vehicle detected by a locator 36 which will be described below. In some embodiments, the vehicle condition information may include stuck state information, vehicle traveling data, and remaining gasoline level information detected by a second recognizer which will be described below.

The CP_ECU 21 may be coupled to a human machine interface (HMI) 31 as illustrated in FIG. 1. The HMI 31 may be located around a driver's seat of the vehicle. In some embodiments, the HMI 31 may include various operation members, various sensing devices, and various notification devices such as a notifier 31a.

Non-limiting examples of the various operation members of the HMI 31 may include multiple operation switches used for instructing execution or suspension of various types of driver assistance control, and traveling mode switches used for switching between multiple traveling modes.

Non-limiting examples of the multiple traveling modes may include a normal traveling mode and a bad-road traveling mode. The bad-road traveling mode may be selected when the vehicle is driving on a road with a bad surface condition, such as a snow road or an unpaved road.

The bad-road traveling mode may further include multiple traveling modes corresponding to various road surface conditions. In some embodiments, the bad-road traveling mode may include a first bad-road mode and a second bad-road mode. The first bad-road mode may address roads such as snow roads or dirt roads (e.g., dry dirt roads) having relatively light traveling conditions. The second bad-road mode may address roads such as deep snow roads or mud roads (e.g., wet mud roads) having more severe traveling conditions.

Non-limiting examples of traveling control performed when the bad-road traveling mode is selected may include drive control for a throttle actuator 32 by the E/G_ECU 22, hydraulic control for a hydraulic control circuit 33 by the T/M_ECU 23, and drive control for a brake actuator 34 by the BK_ECU 24.

In some embodiments, in the drive control for the throttle actuator 32, the E/G_ECU 22 may perform control that suppresses sudden torque changes to reduce sliding, or control that obtains a large driving force earlier to improve bad-road drivability. The E/G_ECU 22 may also perform torque reduction control that reduces engine output when the drive wheels idle.

In the hydraulic control for the hydraulic control circuit 33, the T/M_ECU 23 may perform control that suppresses generation of differential rotation between the front and rear wheels to improve traction performance, and stable traveling control on bad roads by setting a speed ratio lower than that in normal traveling control or by selecting a lock-up region as a dedicated region.

In the driving control for the brake actuator 34, the BK_ECU 24 may perform brake limited slip differential (LSD) control that suppresses differential rotation between the left and right wheels.

These types of control in the bad-road traveling mode may be performed when the vehicle speed is less than or equal to a predetermined speed. In some embodiments, the predetermined speed may be about 40 kilometers per hour (km/h). When the vehicle speed becomes greater than the predetermined speed, the bad-road traveling mode may be canceled by control.

Non-limiting examples of the various sensing devices may include: a steering touch sensor that detects whether a driver holds the steering wheel; a driver monitoring system (DMS) that recognizes the face of the driver who drives the vehicle and detects a line of sight of the driver and other information on the driver; and an in-vehicle monitoring system that includes an in-vehicle camera and other devices that recognize occupants in the vehicle including the driver.

Non-limiting examples of the notifier 31a may include various notification devices such as touch panel displays (visual displays), sounding devices (auditory displays) including speakers and other related parts, and combination meters in which various types of instruments are integrated.

The CP_ECU 21 may be a configuration unit or a circuit unit that, when receiving a control signal from the control processing unit 14, notifies the driver of various kinds of information in a predetermined form (e.g., in the form of visual or auditory display), using the notifier 31*a* included in the HMI 31 as appropriate.

Non-limiting examples of the various kinds of information to be notified using the notifier 31*a* may include various kinds of information such as warning information, driver assistance control implementation statuses, the surrounding environment information on the vehicle, and instruction information related to recovery assistance control which will be described below.

The CP_ECU 21 may output, to the control processing unit 14, various kinds of input information such as instruction signals input by the driver, using the various operation members included in the HMI 31. Non-limiting examples of the instruction signals input by the driver may include signals of on/off instructions for various kinds of driver assistance control, signals of traveling mode switching, and signals of selection instructions.

The throttle actuator 32 of the electronic throttle may be coupled to an output side of the E/G_ECU 22. Various sensors such as an accelerator sensor 32*a* may be coupled to an input side of the E/G_ECU 22.

The E/G_ECU 22 may be a driving device that controls driving of the throttle actuator 32, based on the control signal from the control processing unit 14 or detection signals from the group of various sensors, thereby generating a driving force for the vehicle. This may allow the E/G_ECU 22 to adjust the amount of air intake of the engine and generate a desired engine output. The E/G_ECU 22 may also output signals representing, for example, an accelerator position detected by the accelerator sensor 32*a* in the group of various sensors, to the control processing unit 14.

The hydraulic control circuit 33 may be coupled to an output side of the T/M_ECU 23. Various sensors such as a non-illustrated shift position sensor may be coupled to an input side of the T/M_ECU 23.

The T/M_ECU 23 may control the hydraulic pressure for the hydraulic control circuit 33, based on a signal of engine torque estimated by the E/G_ECU 22 and detection signals from the group of various sensors. This may allow the T/M_ECU 23 to operate elements, such as friction coefficient elements and pulleys, disposed in an automatic transmission, thereby shifting the engine output at a desired speed ratio. The T/M_ECU 23 may also output, to the control processing unit 14, a signal representing, for example, a shift position detected by the group of various sensors.

The brake actuator 34 that adjusts brake fluid pressures output to brake wheel cylinders on the respective wheels may be coupled to an output side of the BK_ECU 24. A non-illustrated group of various sensors including a brake pedal sensor, a yaw rate sensor, a front/rear acceleration sensor, and a vehicle speed sensor may be coupled to an input side of the BK_ECU 24.

The BK_ECU 24 may be a braking device that performs braking control for the vehicle by controlling driving of the brake actuator 34, based on a control signal from the control processing unit 14 or detection signals from the group of various sensors. This may allow the BK_ECU 24 to generate a brake force on each wheel as appropriate to perform forced braking control and yaw-rate control for the vehicle. The BK_ECU 24 may also output signals of, for example, the brake operation state, yaw rate, front/rear acceleration, and vehicle speed (own vehicle speed) having been detected by the various sensors to the control processing unit 14.

An electric power steering motor 35 that provides steering torque generated by a motor rotation force to a steering mechanism may be coupled to an output side of the PS_ECU 25. Various sensors including a non-illustrated steering torque sensor and a steering angle sensor 35*a* may be coupled to an input side of the PS_ECU 25.

The PS_ECU 25 may be a steering device that controls steering of the vehicle by driving the electric power steering motor 35, based on a control signal from the control processing unit 14 or detection signals from the group of various sensors. This may allow the PS_ECU 25 to generate steering torque for the steering mechanism. The PS_ECU 25 may also output, to the control processing unit 14, signals representing, for example, the steering torque and steering angle detected by the group of various sensors.

A group of various sensors including the locator 36, an in-vehicle radar 37, a rear sensor 38, a tilt angle sensor 39, and a wheel speed sensor 40 may be coupled to the control processing unit 14.

The locator 36 may include a GNSS sensor 36*a* and a high-precision road map database (road map DB) 36*b*.

The GNSS sensor 36*a* may measure a position (e.g., latitude, longitude, and altitude) of the vehicle by receiving positioning signals transmitted from multiple positioning satellites.

The road map DB 36*b* may be a large-capacity storage medium such as hard disk drive (HDD) or solid state drive (SSD), and may store high-precision three-dimensional road map information (dynamic map).

The road map DB 36*b* may hold lane data for automated driving, such as lane width data, lane center position coordinate data, lane travel azimuth data, and speed limits. The lane data may be stored at intervals of several meters for each lane on the road map. The road map DB 36*b* may also contain dynamic information that changes over time, such as information on traffic regulations, road construction, accidents, and traffic congestion.

The locator 36 may be configured to acquire real-time surrounding environment information, such as traffic congestion information, weather information, and various kinds of information on parking lots, at the position of the vehicle measured by the GNSS sensor 36*a*, through communication with the external system, for example. Non-limiting examples of the weather information may include fog-occurrence information, rainfall information, snowfall information, snow accumulation information, and temperature and humidity information regarding an area including the position of the vehicle.

The road map DB 36*b* may hold information on spots such as various facilities and parking lots. In some embodiments, the road map DB 36*b* may output, as the surrounding environment information, road map information related to a selected range with respect to the position of the vehicle measured by the GNSS sensor 36*a*, to the control processing unit 14 in response to a request signal from the control processing unit 14. In one embodiment, the road map DB 36*b*, together with the GNSS sensor 36*a*, may serve as the "first recognizer" that recognizes the surrounding environment of the vehicle.

The in-vehicle radar 37 may include multiple sensors, such as millimeter-wave radars. The multiple millimeter-wave radars may detect three-dimensional objects such as pedestrians and parallel vehicles, as well as structures such as curbs, guardrails, walls of buildings, and other three-dimensional objects such as plantings at an edge (e.g., shoulder-side edge) of the road by receiving and analyzing waves reflected from the objects in response to output of radio waves. The multiple millimeter-wave radars may also detect three-dimensional obstacles and similar objects that exist on the road. In this case, the multiple millimeter-wave radars may detect, as three-dimensional object information, the width of the three-dimensional object, the position of a representative point of the three-dimensional object (a relative position and a relative distance with respect to the vehicle), a relative speed, and other information.

The multiple sensors, such as the multiple millimeter-wave radars, included in the in-vehicle radar 37 may include, for example, left-front and right-front side sensors disposed on the left and right sides of a front bumper of the vehicle, and left-rear and right-rear side sensors disposed on the left and right sides of a rear bumper of the vehicle. The left-front and right-front side sensors may detect, as the surrounding environment information, three-dimensional objects in regions located diagonally to the left and right sides of the vehicle and regions located to the sides of the vehicle. These regions may be difficult to recognize in the images captured by the stereo camera 11. The left-rear and right-rear side sensors may detect, as the surrounding environment information, three-dimensional objects in regions located diagonally to the left and right sides of the vehicle and a region located behind the vehicle. These regions may be difficult to recognize with the left-front and right-front side sensors.

In one embodiment, the in-vehicle radar 37 may serve as the "first recognizer" that recognizes the surrounding environment of the vehicle. The information acquired by each sensor of the in-vehicle radar 37 may be sent to the image recognizer 13 through the control processing unit 14.

The rear sensor 38 may include, for example, a member such as a sonar device that measures the distance to an object and the shape of the object using ultrasonic waves. The rear sensor 38 may be one or more sensors disposed, for example, on the rear bumper. The rear sensor 38 may detect, as the surrounding environment information, three-dimensional objects in the region behind the vehicle that is difficult to recognize with the left-rear and right-rear side sensors. In one embodiment, the rear sensor 38 may serve as the "first recognizer" that recognizes the surrounding environment of the vehicle.

The coordinates of each object outside the vehicle in each piece of the surrounding environment information recognized by the image recognizer 13, the locator 36, the in-vehicle radar 37, and the rear sensor 38 may all be converted, at the control processing unit 14, into coordinates that are based on a three-dimensional coordinate system whose origin point is the center of the vehicle.

The tilt angle sensor 39 may be a gradient detection sensor that detects the gradient of the road surface (wheel contact surface) or the tilt angle of the vehicle by detecting the front-back (longitudinal) or left-right (lateral) tilt of the vehicle with respect to a horizontal direction.

The wheel speed sensor 40 may detect a wheel rotation speed by detecting a pulse signal (wheel speed pulse) generated in proportion to the rpm of each wheel (generally four wheels) of a vehicle. The wheel speed sensor 40 may be configured to estimate a vehicle body speed, based on wheel speed data on each wheel acquired by the wheel speed sensor 40. In some embodiments, the wheel speed sensor 40 may be configured to estimate the vehicle body speed by determining the average of each piece of the wheel speed data.

The control processing unit 14 may execute traveling control for the vehicle, based on the respective pieces of information acquired by, for example, the camera unit 10, the group of various sensors including the locator 36, the in-vehicle radar 37, the rear sensor 38, the tilt angle sensor 39, and the wheel speed sensor 40.

The traveling control in this case may include various kinds of vehicle traveling control used as appropriate, such as engine output control and torque distribution control for each drive wheel by the E/G_ECU 22, forward or reverse travel direction control achieved by controlling the transmission by the T/M_ECU 23, and individual braking control for each wheel by the BK_ECU 24.

Note that the various sensors configured to acquire the surrounding environment information are not limited to the sensors described above. In some embodiments, the various sensors configured to acquire the surrounding environment information may include a light detection and ranging (LiDAR) device that measures the distance to an object and the shape of the object using laser beams, a near-infrared sensor, and an outdoor temperature sensor.

The stereo camera 11 described above may be configured to observe a predetermined viewing range ahead of the vehicle. In addition to the stereo camera 11, multiple cameras having similar configurations may be installed to observe a predetermined viewing range including the regions on the sides and behind the vehicle. This makes it possible to observe the entire surrounding area around the vehicle.

In one embodiment, the tilt angle sensor 39, the wheel speed sensor 40, the accelerator sensor 32$a$, and the steering angle sensor 35$a$ out of the group of various sensors described above may each serve as a "second recognizer" that acquires the vehicle condition information.

The control processing unit 14 may also internally include a stuck determiner 15, a first recovery assistance processor 16, and a second recovery assistance processor 17. In one embodiment, the stuck determiner 15 may serve as a "determiner". In one embodiment, the first recovery assistance processor 16 may serve as a "first processor". In one embodiment, the second recovery assistance processor 17 may serve as a "second processor".

The stuck determiner 15 may be a configuration unit or a circuit unit that determines whether the vehicle is in a stuck state. In some embodiments, the stuck determiner 15 may determine whether the vehicle is in the stuck state, based on the vehicle condition information acquired by the second recognizer such as the tilt angle sensor 39, the wheel speed sensor 40, the accelerator sensor 32$a$, or the steering angle sensor 35$a$. When determining that the vehicle is in the stuck state, the stuck determiner 15 may determine a stuck level corresponding to the stuck state. The stuck level will be described in detail below.

The first recovery assistance processor 16 is a configuration unit or a circuit unit that executes first recovery assistance control that automatically assists the vehicle in recovering from the stuck state. Although described in detail below, the first recovery assistance processor 16 may execute the first recovery assistance control according to the stuck level determined by the stuck determiner 15.

The second recovery assistance processor 17 is a configuration unit or a circuit unit that executes second recovery assistance control that outputs a recovery operation instruction (first recovery operation instruction information) to assist the vehicle in recovering from the stuck state, and third recovery assistance control that outputs another recovery operation instruction (second recovery operation instruction information) to assist the vehicle in recovering from the stuck state. Although described in detail below, the second recovery assistance processor 17 may execute the second recovery assistance control according to the stuck level determined by the stuck determiner 15 or a selection instruction input by the driver or user. Although described in detail below, the second recovery assistance processor 17 may also execute the third recovery assistance control when the stuck state still continues after the execution of the first or second recovery assistance control.

Note that all or a part of the components such as the image recognizer 13, the control processing unit 14, the stuck determiner 15, the first recovery assistance processor 16, the second recovery assistance processor 17, the CP_ECU 21, the E/G_ECU 22, the T/M_ECU 23, the BK_ECU 24, and the PS_ECU 25 may include a processor including hardware.

The processor may include, for example, components such as a central processing unit (CPU), a random access memory (RAM), a read only memory (ROM), a non-volatile memory, and a non-volatile storage, and a known configuration that includes a non-transitory computer readable medium and its peripheral equipment.

The components such as the ROM, the non-volatile memory, and the non-volatile storage may be preinstalled with software programs to be executed by the CPU, fixed data such as data tables, and other kinds of data. The CPU may read the software program stored, for example, in the ROM, expand the program in the RAM, and execute the program. The software program may refer, for example, to different kinds of data as appropriate, thereby implementing the functions of the components, the configuration units, and the other elements described above (13 to 17, and 21 to 25).

In some embodiments, the processor may include a semiconductor chip such as a field programmable gate array (FPGA). In some embodiments, each of the components, the configuration units, and the other elements described above (13 to 17, and 21 to 25) may include electronic circuitry.

Furthermore, all or a part of the software program may be recorded as a computer program product on a portable disk such as a flexible disk, a CD-ROM, or a DVD-ROM, or on a non-transitory computer readable medium such as a card-type memory, a hard disk drive (HDD) device, or a solid state drive (SSD) device.

Now, the stuck level to be determined by the stuck determiner 15 in the control processing unit 14 described above will be briefly described below.

The stuck level may indicate the level or degree of the stuck state of the vehicle generated in traveling on the bad-road region. The stuck level may be evaluated at multiple levels. The term "stuck state" used herein may refer to a state in which the vehicle is difficult to move forward or backward, i.e., a state in which the vehicle is difficult to travel.

First, the stuck determiner 15 may determine whether the wheels are idling, referring to, for example, the wheel speed data that is based on an output of the wheel speed sensor 40, and accelerator position data that is based on an output of the accelerator sensor 32*a*. The stuck determiner 15 may also determine an acceleration rate of the vehicle in the front-rear direction, based on an output of a non-illustrated acceleration sensor. The stuck determiner 15 may also determine a temporal change in the position of the vehicle measured by the GNSS sensor 36*a*. The stuck determiner 15 may determine that the vehicle is in the stuck state when determining that the wheels are idling, that the acceleration rate of the vehicle in the front-rear direction is zero, and that there is no change in the position of the vehicle measured by the GNSS sensor 36*a*.

When determining that the vehicle is in the stuck state, the stuck determiner 15 may perform predetermined stuck level evaluation, based on outputs from the tilt angle sensor 39, the wheel speed sensor 40, and the accelerator sensor 32*a*, for example.

The stuck level described in the example embodiment may be evaluated at five levels, i.e., Levels 1 to 5. Level 1 indicates the highest possibility of recovery, and Level 5 indicates the lowest possibility of recovery. In this case, the stuck level may be evaluated as follows.

Level 1: One or more wheels are idling or skidding and the angle of the vehicle in the front-rear direction or in a left-right direction is 5 degrees or less.

Level 2: One or more wheels are idling or skidding and the angle of the vehicle in the front-rear direction or in the left-right direction is 10 degrees or less.

Level 3: Two or more wheels are idling or skidding and the angle of the vehicle in the front-rear direction or in the left-right direction is 20 degrees or less.

Level 4: Three or more wheels are idling or skidding and the angle of the vehicle in the front-rear direction or in the left-right direction is 30 degrees or less.

Level 5: All (four) wheels are idling or skidding and the vehicle is not moving despite a high accelerator pedal position.

As described below, when the stuck level is evaluated as any of Level 1 to Level 3, the first recovery assistance processor 16 of the control processing unit 14 may execute the first recovery assistance control that automatically assists the vehicle in recovering from the stuck state.

Further, as described below, when the stuck level is evaluated as Level 4 or Level 5, the second recovery assistance processor 17 of the control processing unit 14 may output the recovery operation instruction to assist the vehicle in recovering from the stuck state.

Now, the second recovery assistance control in which the second recovery assistance processor 17 outputs the recovery operation instruction will be briefly described below.

The term "recovery operation instruction" used herein may refer to a group of operation instructions determined in advance according to, for example, stuck patterns. The term "stuck patterns" used herein may refer to types of surrounding environmental conditions, such as the road surface condition, under which the vehicle has gotten stuck. The recovery operation instructions according to the example embodiment are illustrated in a table of FIG. 2.

The stuck pattern, such as the road surface condition, may be determined based on image information and other various kinds of information, including the surrounding environment information, acquired by the first recognizer such as the camera unit 10. Therefore, the second recovery assistance processor 17 may first determine the stuck pattern, based on the surrounding environment information acquired by the first recognizer.

Non-limiting examples of the stuck patterns according to the example embodiment may include the following Patterns 1 to 5.

Pattern 1: Wheels are skidding on a flat ground.

Pattern 2: Wheels are skid upon climbing.

Pattern 3: Wheels are stuck in irregularities or rocky areas.

Pattern 4: Wheels are fallen into holes or cave-in.

Pattern 5: Wheels are stuck in sandy or muddy areas

As illustrated in the table of FIG. 2, appropriate recovery operation instructions corresponding to the respective stuck patterns may be determined, and the notifier 31*a* may output the recovery operation instruction corresponding to the determined stuck pattern to the driver or user in a predetermined display format.

In this case, as illustrated in FIG. 2, non-limiting examples of the recovery operation instructions may include a traveling mode to be selected, a shift position to be selected, the degree of accelerator pedal operation, and a steering angle to be set.

As illustrated in FIG. 2, either the first bad-road mode or the second bad-road mode may be indicated as the bad-road traveling mode to be selected, depending on the stuck pattern or the road surface condition.

As illustrated in FIG. 2, the shift position to be selected may be a shift position of the transmission, and an instruction for a selection of a D range may be given for forward travel, regardless of the stuck pattern or the road surface condition.

As illustrated in FIG. 2, an instruction regarding the degree of the accelerator operation may be given, depending on the stuck pattern or the road surface condition. In some embodiments, for Pattern 1, an instruction for an accelerating operation of maintaining the accelerator at a low position may be given. For the patterns other than Pattern 1, an instruction for an operation of gradually stepping on the accelerator may be given.

As illustrated in FIG. 2, "steering angle" may indicate the degree of steering wheel operation. For example, "straight ahead" in FIG. 2 may represent the operation instruction to set the steering angle to approximately 0 degrees, and "turn" may represent the operation instruction to turn the steering wheel at a predetermined steering angle. The predetermined steering angle may be 90 to 180 degrees. The driver or user may perform an appropriate operation in accordance with these operation instructions.

In addition to these operation instructions, reference movies corresponding to the stuck patterns may be prepared. The reference movies may be, for example, video data on a lecture and demonstration, given by an instructor from a vehicle manufacturer, of the operation for the recovery from the stuck state, using a test vehicle actually stuck on test courses in various conditions corresponding to the stuck patterns. This reference movies may be prepared beforehand, for example, by the manufacturer of the vehicle.

As illustrated in FIG. 2, the availability of the reference movie may be explicitly indicated on the output screen indicating the recovery operation instructions. When the reference movie is available, the driver or user may be allowed to play the reference movie if the driver or user voluntarily expresses his/her intention or performs a selection operation.

The traveling assistance apparatus 1 according to the example embodiment described above may perform the predetermined control as appropriate according to the evaluation of the stuck level. In the example embodiment, the first recovery assistance control that automatically assists the vehicle in recovering from the stuck state may be executed in the case of a relatively light stuck state (any one of Level 1 to Level 3). In the case of a more severe stuck state (Level 4 or Level 5), the recovery operation instruction may be given to instruct the driver or user to assist the vehicle in recovering from the stuck state by a manual operation.

In this case, some drivers or users may make a request to enjoy by themselves the recovery operation that assists the vehicle in recovering recover from the stuck state. To respond to such a request, the first recovery assistance processor 16 may be configured to cancel the start of execution of the first assistance recovery control regardless of the result of the evaluation of the stuck level when the driver or user voluntarily performs a selection instruction operation.

In this case, the recovery operation method, i.e., whether the operation for the recovery of the vehicle from the stuck state is to be performed based on the automatic control or the operation for the recovery of the vehicle from the stuck state is all to be performed by the manual recovery operation may be selected using an operation member provided for the driver or user. When selecting the manual recovery operation, the driver or user may be allowed to manually perform the recovery operation, regardless of the result of the evaluation of the stuck level.

There may be a case where the driver or user still struggles to help the vehicle recover from the stuck state even though the driver or user has performed the recovery operation in accordance with the recovery operation instruction given by the second recovery assistance processor 17 described above. Considering such a case, in the example embodiment, the second recovery assistance processor 17 performs the third recovery assistance control other than the second recovery assistance control. In the third recovery assistance control, the other recovery operation instruction (second recovery operation instruction information) may be outputted.

Non-limiting examples of the other recovery operation instruction (second recovery operation instruction information) may include the following instructions.

Instruction A: Remove the floor mat and lay it on the front travel line of the front wheel.

Instruction B: Remove the XX part and use it as a shovel to fill the hole into which the wheel has fallen.

Instruction C: Switch back the vehicle in the front-rear direction by alternating between D and R ranges.

In this case, Instructions A, B, and C described above may not be consecutive instructions but individual instructions corresponding to the respective stuck patterns. Even for the other recovery operation instruction (second recovery operation instruction information), reference movies corresponding to the respective instructions may be prepared.

There may still be a case where the driver or user still struggles to help the vehicle recover from the stuck state even though the driver or user has performed the other recovery operation in accordance with the other recovery operation instruction (second recovery operation instruction information) given by the second recovery assistance processor 17 described above in the third recovery assistance control.

Considering such a case, in the example embodiment, additional control may be performed that sends the information center 50, which is the predetermined external facility or external system, a rescue assistance request along with the surrounding environment information and the vehicle condition information such as stuck position information, travel data, and remaining fuel level, by establishing communication between the in-vehicle DCM 20 and the information center 50.

In some embodiments, the predetermined external facility or external system may be a dedicated network established by the vehicle manufacturer or a communication company, a nearby dealership of the vehicle manufacturer, or a private company that provides road services.

Figure 3:
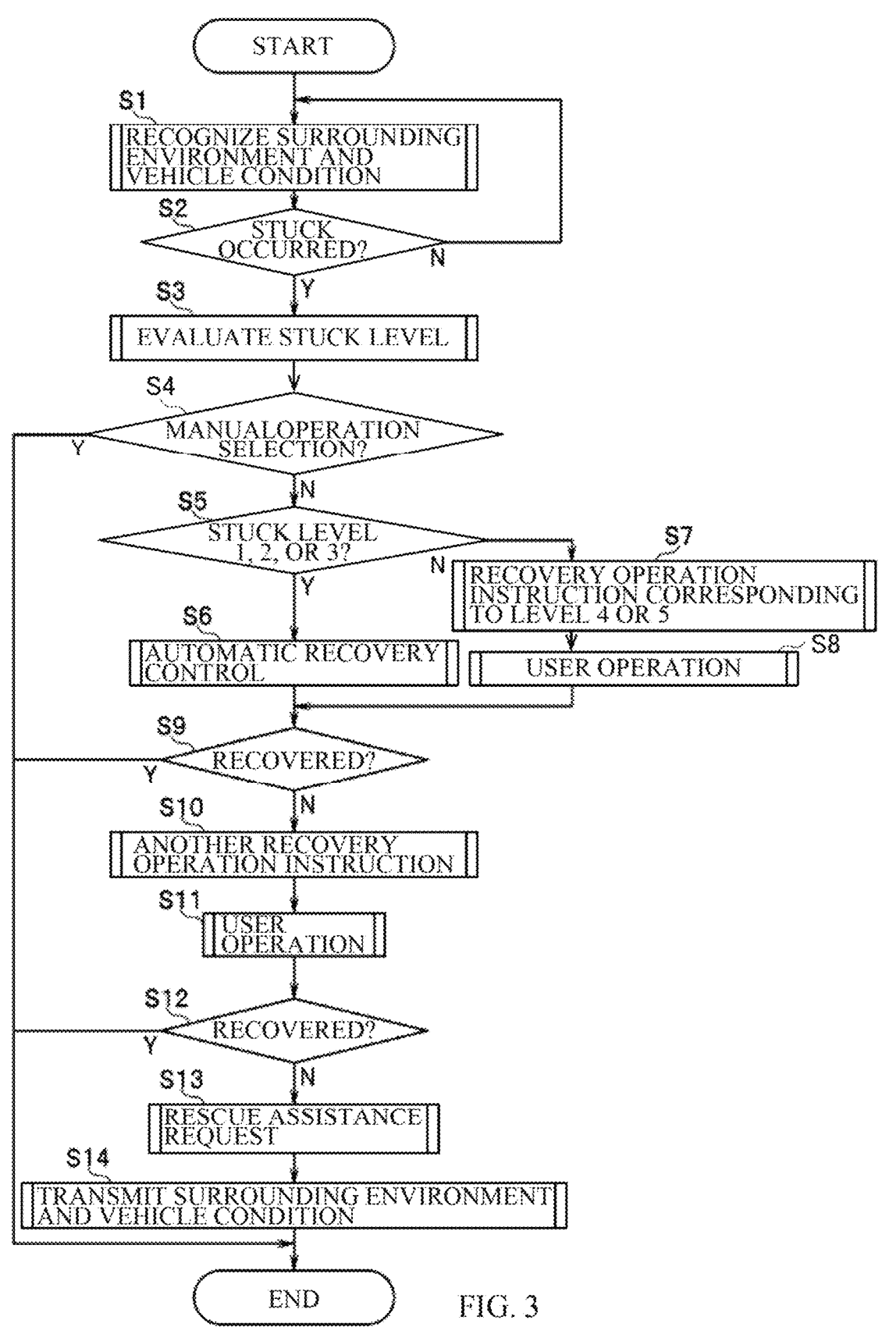
FIG. 3 is a flowchart of control to be performed by the traveling assistance apparatus illustrated in FIG. 1 when the vehicle has come into a stuck state during travel on a bad-road region, which is a part of operations of the traveling assistance apparatus.

Out of the operations of the traveling assistance apparatus 1 having the configuration according to the example embodiment of the disclosure described above, the recovery assistance control used to assist the vehicle in recovering from the stuck state caused during the travel on the bad-road region will now be described with reference to FIG. 3. FIG. 3 is a flowchart illustrating the recovery assistance control used to assist the vehicle in recovering from the stuck state, which is a part of the operations of the traveling assistance apparatus 1 for the vehicle according to the example embodiment of the disclosure.

In the following description, it may be assumed that the operation of the traveling assistance apparatus is executed in a situation where, for example, a vehicle driven by an ordinary driver or user has been unintentionally stuck during the travel on a bad road such as a snow road, a forest road, or a campsite, for leisure.

In this case, it may be first assumed that a vehicle mounted with the traveling assistance apparatus 1 is traveling forward on the road or region. Here, the term "road or region" may encompass various roads such as general public roads and private roads, and regions other than general roads such as campgrounds, riverbeds, and other public and private properties. When the vehicle is traveling, the traveling assistance apparatus 1 according to the example embodiment mounted on the vehicle may be in an activated state.

When the vehicle is in the activated state, the control processing unit 14 may acquire, in Step S1 illustrated in FIG. 3, the surrounding environment information and the vehicle condition information, based on the data output from the camera unit 10, the group of various sensors (36 to 40), and other components. The processing of recognizing the surrounding environment and the vehicle condition may be continuously executed while the traveling assistance apparatus 1 mounted in the vehicle is in the activated state.

In Step S2, the stuck determiner 15 of the control processing unit 14 may determine whether the stuck has occurred, i.e., whether the vehicle is in the stuck state, based on the various kinds of information acquired in the processing at Step S1 described above. The occurrence of the stuck may be determined by determining wheel idling, changes in vehicle position, and other factors, based on the vehicle condition information, as described above.

When it is determined in Step S2 that the stuck has occurred (Step S2: Y), the process may proceed to Step S3. When it is determined that no stuck has occurred (Step S2: N), the process may return to Step S1 described above, and the subsequent processing may be repeated.

In Step S3, the stuck determiner 15 of the control processing unit 14 may perform the processing of evaluating the stuck level. The processing of evaluating the stuck level may be performed as described above.

Thereafter, in Step S4, the control processing unit 14 may determine whether the operation selection instruction for the manual recovery operation of assisting the vehicle in recovering from the stuck state has been given. The operation selection instruction may be given when the driver or user intentionally operates a predetermined operation member included in the HMI 31. When an on signal for the manual recovery operation is confirmed (Step S4: Y), the series of processing may be terminated or end. When the on signal for the manual recovery operation is not confirmed (Step S4: N), the process may proceed to Step S5.

In Step S5, the control processing unit 14 may determine whether the stuck level has been evaluated as any one of Level 1 to Level 3 in the processing of evaluating the stuck level at Step S3 described above. When the stuck level has been evaluated as any of Level 1 to Level 3 (Step S5: Y), the process may proceed to Step S6. When the stuck level has been evaluated as Level 4 or Level 5 (Step S5: N), the process may proceed to Step S7.

In Step S7, the control processing unit 14 may execute the second recovery assistance control that outputs the recovery operation instruction corresponding to Level 4 or Level 5, depending on the stuck level.

Thereafter, in Step S8, the control processing unit 14 may perform user-operation control processing for each configuration unit in accordance with the operation instruction from the driver or user. Thereafter, the process may proceed to Step S9.

In contrast, when the stuck level has been evaluated as any one of Level 1 to Level 3 in Step S5 described above (Step S5: Y), the process may proceed to Step S6. In Step S6, the first recovery assistance processor 16 of the control processing unit 14 may execute the predetermined recovery assistance control that automatically assists the vehicle in recovering from the stuck state corresponding to each of Level 1 to Level 3. Thereafter, the process may proceed to Step S9.

In Step S9, the stuck determiner 15 of the control processing unit 14 may confirm whether the vehicle has recovered from the stuck state. The confirmation as to whether the vehicle has recovered from the stuck state may correspond to a stuck state determination that is based on the vehicle condition information acquired by the second recognizer. In some embodiments, the stuck determiner 15 may determine that the vehicle has recovered from the stuck state when the movement of the vehicle has been confirmed.

When the recovery from the stuck state is confirmed in the processing of Step S9 (Step S9: Y), the series of processing may be terminated or end. When the recovery from the stuck state is not confirmed (Step S9: N), the process may proceed to the next step, i.e., Step S10.

In Step S10, the second recovery assistance processor 17 of the control processing unit 14 may execute the third recovery assistance control other than the second recovery assistance control. In the third recovery assistance control, the other recovery operation instruction (second recovery operation instruction information) is outputted.

The other recovery operation instruction (second recovery operation instruction information) output in this case may be as described above.

In Step S11, the control processing unit 14 may perform the user-operation control processing for each configuration unit in accordance with the operation instruction from the driver or user. Thereafter, the process may proceed to Step S12.

In Step S12, the stuck determiner 15 of the control processing unit 14 may confirm whether the vehicle has recovered from the stuck state. When the recovery from the stuck state is confirmed (Step S12: Y), the series of processing may be terminated or end. When the recovery from the stuck state is not confirmed (Step S12: N), the process may proceed to the next step, i.e., Step S13.

In Step S13, the control processing unit 14 may communicate with the predetermined external facility or external system via the in-vehicle DCM 20 to execute processing of sending the rescue assistance request.

Thereafter, in Step S14, the control processing unit 14 may execute processing of transmitting the vehicle surrounding environment information and vehicle condition information currently acquired. Thereafter, the series of processing may be terminated or end. The driver or user may wait for the rescue assistance without any work.

According to the example embodiment described above, the determination as to whether the stuck state has occurred is made during the travel of the vehicle on the bad-road region. When it is determined that the stuck state has occurred, the stuck level is evaluated. The traveling control to assist the vehicle in recovering from the stuck state is automatically performed, depending on the evaluated stuck level.

When the stuck level is relatively low, the first recovery assistance control that automatically assists the vehicle in recovering from the stuck state may be automatically executed. When the stuck level is high, the second recovery assistance control may be executed that outputs the first recovery operation instruction information based on which the vehicle is to recover from the stuck state.

Such traveling assistance control allows the driver or user, for example, to perform an appropriate operation of assisting the vehicle in recovering from the stuck state, even if the driver or user does not have knowledge about the appropriate operation.

Therefore, when the vehicle is in the stuck state, it is possible to secure the possibility of an easy and quick recovery from the stuck state, regardless of the stuck level. It is also possible to remove the anxiety of the driver or user caused by the stuck state and to make the driver or user assured that he/she will manage to easily address the stuck state and achieve the recovery of the vehicle from the stuck state.

According to the example embodiment described above, it is possible to provide the traveling assistance control apparatus for the vehicle that makes it possible to automatically execute, when the vehicle has come into the stuck state during the travel in the bad-road region, the traveling assistance control for the vehicle, including the control for the recovery of the vehicle from the stuck state, by recognizing the surrounding environment and the vehicle condition.

When the recovery from the stuck state is still difficult to achieve even after the execution of the first or second recovery assistance control, the third recovery assistance control may be performed in which the vehicle receives the other recovery operation instruction (second recovery operation instruction information). This ensures a wider range of possibilities of the recovery of the vehicle from the stuck state.

When the recovery from the stuck state is difficult even with the third recovery assistance control, the rescue assistance request may be made through the communication with the external facility or external system. This allows the driver or user to feel even more secured.

In addition, when the reference movie corresponding to the stuck pattern is prepared, the driver or user may manage to understand the recovery operation instruction given in the second recovery assistance control more clearly by viewing the reference movie. This makes the traveling assistance more reliable, quicker, and safer.

In the flowchart of FIG. 3, when the on signal for manual operation is confirmed in the processing of Step S4 described above, the series of processing may be terminated immediately because the driver or user desires to perform the manual driving operation. However, this processing is a non-limiting example.

In some embodiments, when the on signal for the manual operation is confirmed in the processing of Step S4, processing of determining whether the driver or user desires notification displaying of the recovery operation instruction. When the driver or user performs an operation of selecting the notification displaying of the recovery operation instruction, the second recovery assistance processor 17 may give a predetermined recovery operation instruction depending on the stuck level. The operation at this time may be substantially similar to that in the processing of Step S8; however, in this case, the recovery operation instructions corresponding to Level 1 to Level 3 may be further included.

The disclosure described above is not limited to the foregoing example embodiments, and various alternations and modifications may be made in the implementation stage without departing from the gist of the technology. Further, the foregoing example embodiments each include various stages of the technology, and various technologies may be extracted by appropriately combining the features of the technology disclosed herein. For example, even if some components are deleted from all the components described in the foregoing example embodiments, the configuration including the remaining components may be extracted as a technology as long as the above-described issues are addressed and the above-described effects are obtained. Furthermore, the components in the different example embodiments may be combined as appropriate. The disclosure is not limited by any of particular example embodiments but by the appended claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The control processing unit 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control processing unit 14 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control processing unit 14 illustrated in FIG. 1.

The invention claimed is:

1. A traveling assistance apparatus for a vehicle, the traveling assistance apparatus comprising:
a first recognizer configured to acquire surrounding environment information on the vehicle;

a second recognizer configured to acquire vehicle condition information on the vehicle;

a notifier configured to notify a driver who drives the vehicle of predetermined information; and a control processing unit configured to perform traveling control for the vehicle, the control processing unit comprising one or more processors and one or more memories storing instructions that, when executed by the one or more processors, cause the control processing unit to:

determine whether the vehicle is in a stuck state, based on the vehicle condition information, and make an evaluation of a stuck level when the vehicle is determined to be in the stuck state, the stuck level being evaluated based on a number of wheels of the vehicle that are idling or skidding and an angle of the vehicle in a front-rear direction or a left-right direction, execute first recovery assistance control that automatically assists the vehicle in recovering from the stuck state, and execute second recovery assistance control that outputs, to the notifier, first recovery operation instruction information based on which the driver of the vehicle is to perform a recovery operation to recover the vehicle from the stuck state, wherein the control processing unit is configured to execute any one of the first recovery assistance control or the second recovery assistance control, depending on the stuck level.

2. The traveling assistance apparatus according to claim 1, wherein, when the stuck state continues even after execution of any one of the first recovery assistance control or the second recovery assistance control, the one or more processors of the control processing unit are configured to execute third recovery assistance control that outputs, to the notifier, second recovery operation instruction information different from the first recovery operation instruction information.

3. The traveling assistance apparatus according to claim 2, further comprising a communicator configured to establish interactive communication between the vehicle and an external system, wherein, the control processing unit is configured to, when the stuck state continues even after execution of the third recovery assistance control, send a rescue assistance request to the external system through the interactive communication between the vehicle and the external system established by the communicator, and transmit the surrounding environment information and the vehicle condition information to the external system.

4. The traveling assistance apparatus according to claim 1, further comprising an operation member configured to cancel a start of the execution of the first recovery assistance control, wherein the control processing unit is configured to execute the second recovery assistance control, regardless of a result of the evaluation of the stuck level.

5. A traveling assistance apparatus for a vehicle, the traveling assistance apparatus comprising circuitry configured to:

acquire surrounding environment information on the vehicle;

acquire vehicle condition information on the vehicle;

cause a notifier to notify a driver who drives the vehicle of predetermined information;

and perform traveling control for the vehicle, wherein the circuitry is configured to determine whether the vehicle is in a stuck state, based on the vehicle condition information, and evaluate a stuck level when the vehicle is determined to be in the stuck state, the stuck level being evaluated based on a number of wheels of the vehicle that are idling or skidding and an angle of the vehicle in a front-rear direction or a left-right direction, execute first recovery assistance control that automatically assists the vehicle in recovering from the stuck state, execute second recovery assistance control that outputs, to the notifier, first recovery operation instruction information based on which the driver of the vehicle is to perform a recovery operation to recover the vehicle from the stuck state, and execute any one of the first recovery assistance control or the second recovery assistance control, depending on the stuck level.

6. The traveling assistance apparatus according to claim 1, wherein the first recovery operation instruction information is determined based on a stuck pattern corresponding to a road surface condition under which the vehicle has gotten stuck, and the first recovery operation instruction information includes at least one of a traveling mode to be selected, a shift position to be selected, a degree of accelerator pedal operation, or a steering angle to be set.

7. The traveling assistance apparatus according to claim 6, wherein the one or more processors of the control processing unit are configured to output, to the notifier, a reference movie corresponding to the stuck pattern.

8. The traveling assistance apparatus according to claim 5, wherein, when the stuck state continues even after execution of any one of the first recovery assistance control or the second recovery assistance control, the circuitry is configured to execute third recovery assistance control that outputs, to the notifier, second recovery operation instruction information different from the first recovery operation instruction information.

9. The traveling assistance apparatus according to claim 8, further comprising a communicator configured to establish interactive communication between the vehicle and an external system, wherein the circuitry is configured to, when the stuck state continues even after execution of the third recovery assistance control, send a rescue assistance request to the external system through the interactive communication between the vehicle and the external system established by the communicator, and transmit the surrounding environment information and the vehicle condition information to the external system.

10. The traveling assistance apparatus according to claim 5, further comprising an operation member configured to cancel a start of the execution of the first recovery assistance control, wherein the circuitry is configured to execute the second recovery assistance control, regardless of a result of the evaluation of the stuck level.

11. The traveling assistance apparatus according to claim 5, wherein the first recovery operation instruction information is determined based on a stuck pattern corresponding to a road surface condition under which the vehicle has gotten stuck, and the first recovery operation instruction information includes at least one of a traveling mode to be selected, a shift position to be selected, a degree of accelerator pedal operation, or a steering angle to be set.

12. The traveling assistance apparatus according to claim 11, wherein the circuitry is configured to output, to the notifier, a reference movie corresponding to the stuck pattern.

\* \* \* \* \*